US010367399B2

(12) United States Patent
Beckman et al.

(10) Patent No.: US 10,367,399 B2
(45) Date of Patent: Jul. 30, 2019

(54) MOTOR WITH ADJUSTABLE BACK-ELECTROMOTIVE FORCE

(71) Applicant: Amazon Technologies, Inc., Seattle, WA (US)

(72) Inventors: Brian C. Beckman, Newcastle, WA (US); Austin Brown, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 15/268,390

(22) Filed: Sep. 16, 2016

(65) Prior Publication Data
US 2018/0083495 A1  Mar. 22, 2018

(51) Int. Cl.
*H02K 1/27* (2006.01)
*H02K 7/14* (2006.01)
*H02K 21/22* (2006.01)
*H02K 29/08* (2006.01)
*H02K 11/215* (2016.01)

(52) U.S. Cl.
CPC .......... *H02K 21/22* (2013.01); *H02K 1/2786* (2013.01); *H02K 11/215* (2016.01); *H02K 29/08* (2013.01); *H02K 7/14* (2013.01); *H02K 2213/03* (2013.01)

(58) Field of Classification Search
CPC .... H02K 21/22; H02K 11/215; H02K 1/2786; H02K 29/08; H02K 7/14; H02K 2213/03
USPC ................................... 310/216.111
See application file for complete search history.

(56) References Cited

U.S. PATENT DOCUMENTS

| 8,772,998 | B2 * | 7/2014 | Maximov | H02K 1/148 310/156.01 |
| 2010/0117475 | A1 | 5/2010 | Leonardi et al. | |
| 2010/0314963 | A1 * | 12/2010 | Gruendl | H02K 1/223 310/156.07 |
| 2012/0019094 | A1 * | 1/2012 | Shin | G11B 19/2009 310/216.048 |
| 2016/0039529 | A1 | 2/2016 | Buchmueller et al. | |

(Continued)

FOREIGN PATENT DOCUMENTS

DE  102012201347 A1  8/2013
EP  2448097 A1  5/2012

OTHER PUBLICATIONS

International Search Report and Written Opinion for PCT Application No. PCT/US2017/051925 dated Jan. 29, 2018.

*Primary Examiner* — Forrest M Phillips
(74) *Attorney, Agent, or Firm* — Athorus, PLLC

(57) ABSTRACT

The described apparatus and method enable alteration of motor properties during operation of a motor. For example, the rotor of the motor may be adjustable, during motor operation, between a first diameter and a larger, second diameter. When the diameter of the rotor increases, the distance between the electromagnetic coils of the stator and the magnets of the rotor increases, thereby reducing the back-electromotor force (back-EMF) of the motor. When the back-EMF of the motor decreases, the torque of the motor decreases but the maximum revolutions per minute (RPM) increases. When the diameter of the rotor decreases, the distance between the electromagnetic coils of the stator and the magnets of the rotor decreases, thereby increasing the back-EMF of the motor. When the back-EMF of the motor increases, the torque of the motor increases but the maximum RPM decreases.

19 Claims, 10 Drawing Sheets

(56) References Cited

U.S. PATENT DOCUMENTS

2017/0288498 A1\* 10/2017 Qin ........................ F04D 25/06
2018/0034392 A1\* 2/2018 Hause ................... F04D 27/004

\* cited by examiner

MOTOR WITH ADJUSTABLE BACK-ELECTROMOTIVE FORCE

BACKGROUND

Unmanned aerial vehicles are continuing to increase in use. For example, unmanned aerial vehicles are often used for surveillance. While there are many beneficial uses of unmanned aerial vehicles, they also have many drawbacks. For example, many unmanned aerial vehicles utilize multiple motors and propellers to maintain flight and navigate. For example, some unmanned aerial vehicles may include four motors and propellers, referred to as quad-copters, eight motors and propellers, referred to as octo-copters, etc. Utilizing multiple motors increases the sound generated by the unmanned aerial vehicle.

BRIEF DESCRIPTION OF THE DRAWINGS

The detailed description is described with reference to the accompanying figures. In the figures, the left-most digit(s) of a reference number identifies the figure in which the reference number appears.

Figure 1:
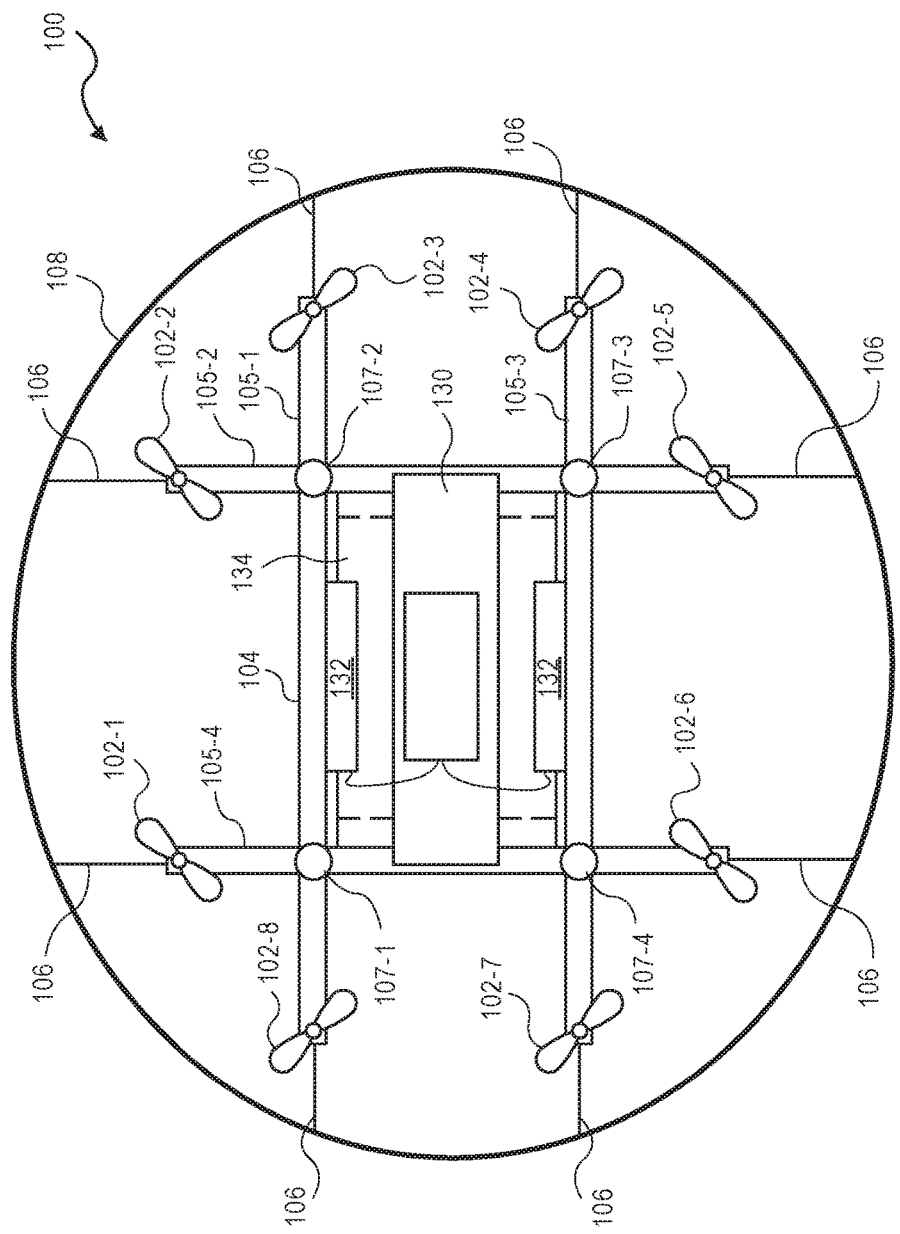
FIG. 1 depicts a block diagram of a top-down view of an unmanned aerial vehicle, according to an implementation.

While implementations are described herein by way of example, those skilled in the art will recognize that the implementations are not limited to the examples or drawings described. It should be understood that the drawings and detailed description thereof are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes methods and apparatus for altering the sound generated by a motor during operation. For example, rather than equally spacing magnets of a rotor of a brushless direct current (DC) motor equally about the rotor, the implementations described herein include a motor in which the spacing between the rotor magnets is non-uniform (i.e., the spacing varies between rotor magnets). With non-uniform spacing of the rotor magnets, the sound generated during operation of the motor is altered. In some implementations, the non-uniform spacing may be a small amount such that traditional electronic speed controllers (ESC) may continue to be operable and control rotation of the motor. In other implementations, the motor may include one or more sensors and/or controllers that monitor a position of the rotor, determine current patterns for different electromagnetic coils of the stator of the motor, and/or send different currents to different electromagnetic coils of the motor to control operation of the motor. In still other implementations, the spacing or alignment of the electromagnetic coils of the stator may also be non-uniform or irregularly spaced.

In addition to altering the sound of the motor through non-uniform spacing of the rotor magnets, non-uniform distribution of the electromagnetic coils, and/or controlling the current patterns to different electromagnetic coils, in some implementations, one or more properties of the motor may be altered during operation of the motor. For example, the rotor of the motor may be adjustable, during motor operation, between a first diameter and a larger, second diameter. When the diameter of the rotor increases, the distance between the electromagnetic coils of the stator and the magnets of the rotor increases, thereby reducing the back-electromotor force (back-EMF) of the motor. When the back-EMF of the motor decreases, the torque of the motor decreases but the maximum revolutions per minute (RPM) increases. When the diameter of the rotor decreases, the distance between the electromagnetic coils of the stator and the magnets of the rotor decreases, thereby increasing the back-EMF of the motor. When the back-EMF of the motor increases, the torque of the motor increases but the maximum RPM decreases.

During aerial navigation of an aerial vehicle, such as an unmanned aerial vehicle (UAV), the desired operational properties of the motors may vary. For example, during takeoff, landing, or while maneuvering in particular areas, higher motor torque may be desirable over a higher maximum RPM. In comparison, during transit flight at a high altitude, higher maximum RPM may be more desirable than higher torque. By altering the diameter of the rotor of the motor, thereby increasing or decreasing the back-EMF of the motor, the torque and maximum RPM is likewise adjusted.

FIG. 1 illustrates a block diagram of a top-down view of an UAV 100, according to an implementation. As illustrated in FIG. 1, the UAV 100 includes eight propellers 102-1, 102-2, 102-3, 102-4, 102-5, 102-6, 102-7, 102-8 powered by motors and spaced about a body 104 of the UAV as part of a propulsion system. Details of the motors are provided below.

The motors and propellers 102 may be of any type and of a size sufficient to lift the UAV 100 and any items engaged by the UAV 100 so that the UAV 100 can navigate through the air, for example, to deliver an item to a location. The propellers may be made of one or more suitable materials such as graphite, carbon fiber, etc. The propellers may be fixed or variable pitch propellers. Likewise, in some implementations, the motors and/or motor arms may be configured such that an angle or orientation of the motor with respect to the UAV may be altered. While the example of FIG. 1 includes eight motors and propellers, in other implementations, more or fewer motors and/or propellers may be utilized for the propulsion system of the UAV 100. Likewise, in some implementations, the motors and/or propellers may be positioned at different locations on the UAV 100. In addition, alternative methods of propulsion may be utilized. For example, engines, fans, jets, turbojets, turbo fans, jet engines, and the like may be used to propel the UAV.

The body 104 or frame of the UAV 100 may be of any suitable material, such as graphite, carbon fiber, and/or aluminum. In this example, the body 104 of the UAV 100 includes four rigid members 105-1, 105-2, 105-3, 105-4, or beams arranged in a hash pattern with the rigid members intersecting and joined at approximately perpendicular angles at intersection points 107-1, 107-2, 107-3 and 107-4. The propellers 102 and corresponding motors are positioned at both ends of each rigid member 105. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some embodiments, all of the rigid members 105 may be of approximately the same length while, in other implementations, some or all of the rigid members may be of different lengths. Likewise, the spacing between the two sets of rigid members may be approximately the same or different.

While the implementation illustrated in FIG. 1 includes four rigid members 105 that are joined to form at least part of the body 104, in other implementations, there may be fewer or more components to the body 104. For example, rather than four rigid members, in other implementations, the body 104 of the UAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the body 104. As discussed further below, a cavity within the body 104 may be configured to include an engagement mechanism 134 for the engagement and transport of item(s) and/or containers that contain item(s) (e.g., for the delivery of an ordered item to a user).

In some implementations, the UAV may be configured for aerodynamics. For example, an aerodynamic housing may be included on the UAV that encloses the UAV control system 130, one or more of the rigid members 105, the body 104, and/or other components of the UAV 100. The housing may be made of any suitable material(s) such as graphite, carbon fiber, aluminum, etc. Likewise, in some implementations, the engagement mechanism 134 may be configured such that, when an item is engaged, it is enclosed within the frame and/or housing of the UAV 100 so that no additional drag is created during transport of the item by the UAV 100.

Extending outward from each rigid member is a support arm 106 that is connected to a safety barrier 108. In this example, the safety barrier is positioned around and attached to the UAV 100 in such a manner that the motors and propellers 102 are within the perimeter of the safety barrier 108. The safety barrier may be plastic, rubber, etc. Likewise, depending on the length of the support arms 106 and/or the length, number or positioning of the rigid members 105, the safety barrier may be round, oval, or any other shape.

Mounted to the body 104 is the UAV control system 130. In this example, the UAV control system 130 is mounted in the middle and on top of the body 104. The UAV control system 130, as discussed in further detail below with respect to FIG. 8, controls the navigation, communication and other operations of the UAV 100. In various implementations, the UAV 100 may also include one or more power modules 132. In this example, the UAV 100 includes two power modules 132 that are removably mounted to the body 104. In various implementations, the power module(s) for the UAV may be in the form of battery power, solar power, gas power, super capacitor, fuel cell, alternative power generation source, or a combination thereof. The power modules 132 are coupled to and provide power for the UAV control system 130, the motors, and/or other components of the UAV 100.

As noted above, the UAV may also include an engagement mechanism 134. The engagement mechanism 134 may be configured to engage and disengage items and/or containers that hold items. In this example, the engagement mechanism 134 is positioned within a cavity of the body 104 that is formed by the intersections of the rigid members 105. The engagement mechanism 134 may be positioned beneath the UAV control system 130. In implementations with additional rigid members, the UAV may include additional engagement mechanisms and/or the engagement mechanism 134 may be positioned in a different cavity within the body 104. The engagement mechanism 134 may be of any size sufficient to securely engage and disengage items and/or containers that contain items. The engagement mechanism 134 communicates with (e.g., via wired or wireless communication) and is controlled by the UAV control system 130.

While the implementations of the UAV discussed herein utilize propellers to achieve and maintain flight, in other implementations, the UAV may be configured in other manners. For example, the UAV may also include fixed wings and/or a combination of both propellers and fixed wings. In such configurations, the UAV may utilize one or more propellers to enable takeoff and landing and a fixed wing configuration or a combination wing and propeller configuration to sustain flight while the UAV is airborne.

Figure 2:
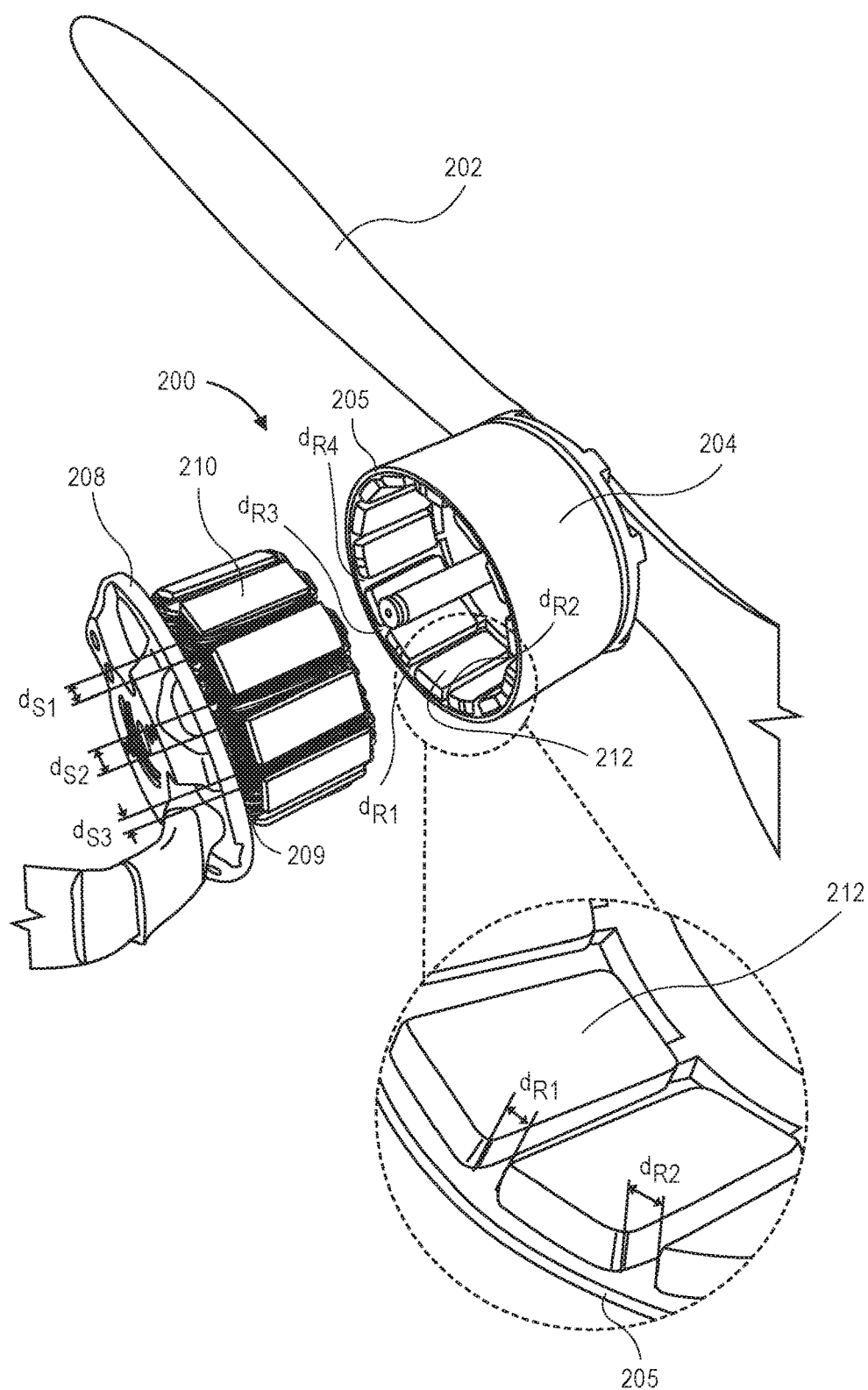
FIG. 2 depicts a detailed view of a motor stator and the magnets of the rotor of the motor, according to an implementation.

FIG. 2 depicts a detailed view of a outrunner brushless direct current (DC) motor 200 and the magnets 212 of the rotor 204 of the motor 200, according to an implementation. An outrunner brushless DC motor typically includes a base 208, a stator 209, and a rotor 204. The base 208 is generally used to affix the motor 200 to an aerial vehicle, such as a UAV. Likewise, the stator 209 is coupled to the base. The stator 209, also known as an armature, includes an electromagnetic assembly 210, and is typically configured in a cylindrical manner, as shown in FIG. 2, and remains stationary on the base.

The rotor 204 is also configured in a cylindrical manner such that it extends above the base 208 and a housing 205 of the rotor 204 forms a cavity that substantially encompasses and rotates around the electromagnetic assembly 210 of the stator 209. On an interior surface of the rotor housing 205 are a series of magnets 212 that are used to drive rotation of the rotor. Specifically, as is known in the art, when a current is applied to the electromagnetic coils 210, it causes alternating polarities of the electromagnetic coils which attract or repel the magnets 212 affixed to the interior surface of the rotor housing 205. The attraction/repulsion of the magnets 212 by the electromagnetic coils 210 of the stator 209 cause the rotor 204 to rotate. A propeller 202 is also affixed to the rotor 204 and rotates with the rotor 204.

As illustrated in the expanded view of FIG. 2, the magnets 212 are affixed to the interior surface of the rotor housing 205. In the described implementations, the spacing between the magnets is non-uniform. For example, the spacing between the plurality of magnets 212 may be random, in a repeating pattern, or other configuration such that the spacing between two magnets is different than the spacing between at least two other magnets 212 of the rotor 204. In some implementations, the spacing between the magnets 212 is such that no two spaces are the same. In other implementations, the spacing is such that spacing between each adjacent pair of magnets is different. For example, the distance $d_{R1}$ is different than the distance $d_{R2}$. Likewise, the distance $d_{R3}$ may be different than the distances $d_{R1}$ and $d_{R4}$ but may be the same or different than the distance $d_{R2}$. In other implementations, each of the distances $d_{R1}$, $d_{R2}$, $d_{R3}$, and $d_{R4}$ may be different. The "distance" between two magnets of the rotor, as used herein, may be a linear distance or a circumferential distance. For example, the distance $d_{R1}$ between two adjacent rotor magnets 212 may be a first circumferential distance and the distance $d_{R2}$, which is different than $d_{R1}$, between two other adjacent rotor magnets 212, may be a second circumferential distance.

In some implementations, in addition to and/or as an alternative to varying the spacing between the magnets 212 of the rotor, the spacing between the plurality electromagnetic coils 210 of the stator 209 may be varied such that the spacing of the electromagnetic coils is non-uniform. For example, the spacing between the plurality of electromagnetic coils 210 may be random, in a repeating pattern, or any other configuration such that the spacing between two electromagnetic coils is different than the spacing between at least two other electromagnetic coils 210 of the stator 209. In some implementations, the spacing between the electromagnetic coils 210 is such that no two electromagnetic coils are the same distance apart. In other implementations, the spacing is such that the spacing between each adjacent pair of electromagnetic coils is different. For example, the distance $d_{S1}$ is different than the distance $d_{S2}$. Likewise, the distance $d_{S3}$ may be different than the distance $d_{S2}$ but may be the same or different than the distance $d_{S1}$. In other implementations, each of the distances $d_{S1}$, $d_{S2}$, and $d_{s3}$ may be different.

By varying the spacing of the magnets 212 of the rotor and/or the spacing of the electromagnetic coils 210 of the stator 209, the sound generated by the motor during operation is altered. In traditional outrunner brushless DC motors, during operation, the motor generates a periodic noise. By irregularly spacing the magnets of the rotor and/or the electromagnetic coils of the stator, the resultant sound during operation is non-periodic, or random (e.g., there is no discreet or dominant tone). In some implementations, the resulting sound of motors designed according to the implementations discussed herein is representative of a broadband noise, such as white noise.

Figure 3:
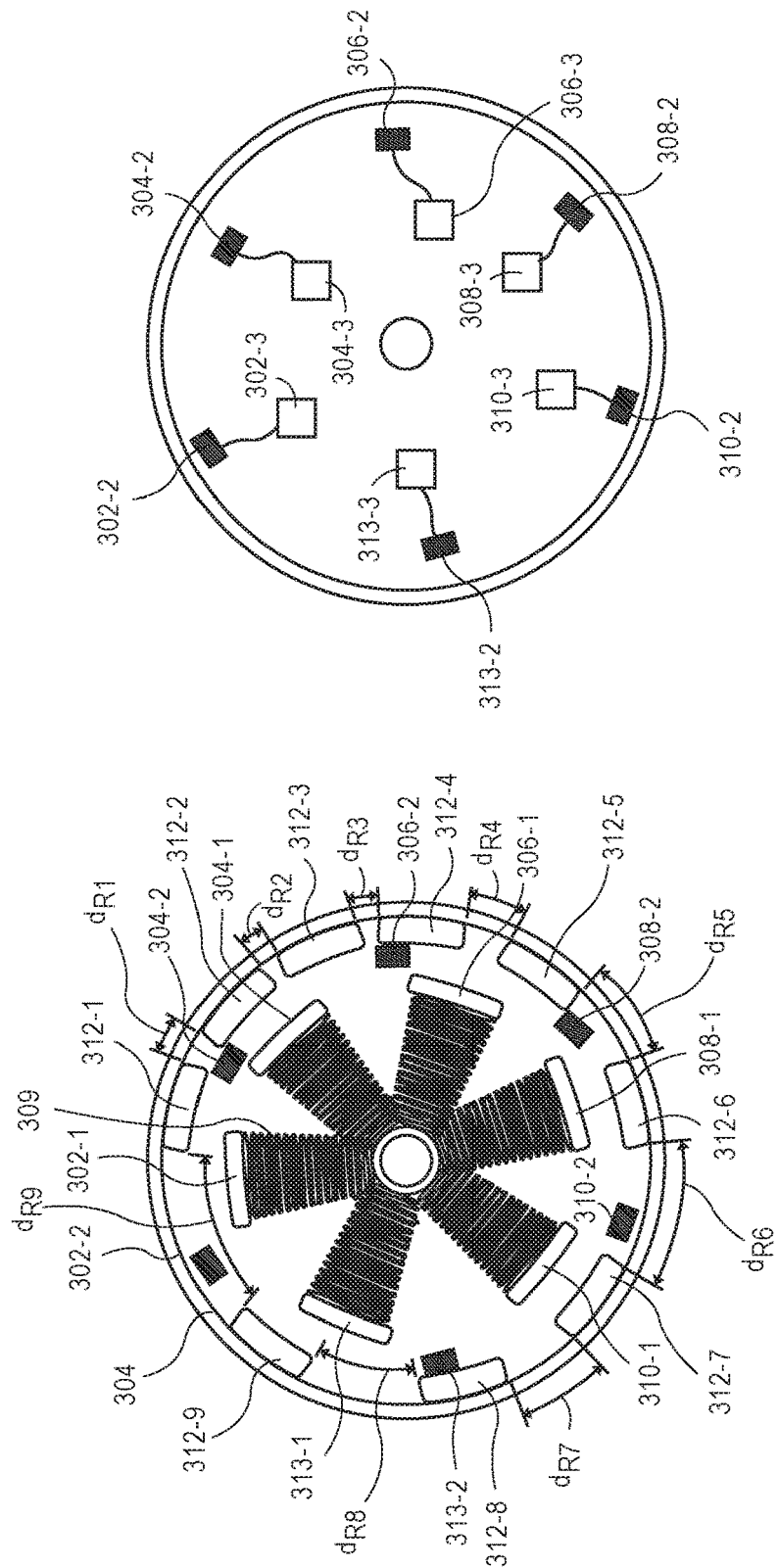
FIG. 3A depicts a top-down view of a motor stator and a rotor of a outrunner brushless motor, according to an implementation.
FIG. 3B depicts a view of a sensor and controller plate of the outrunner brushless motor illustrated in FIG. 3A, according to an implementation.

FIG. 3A depicts a top-down view of a motor stator 309 and a rotor 304 of an outrunner brushless motor, according to an implementation. In this example, there are nine magnets 312 that are irregularly spaced about the interior surface of the rotor 304. Likewise, the stator 309 includes six electromagnetic coils 302-1, 304-1, 306-1, 308-1, 310-1, 313-1 that are irregularly spaced. As discussed above, the spacing of the magnets 312 about the interior of the rotor may be such that distance between each magnet is different, that no two adjacent distances are the same, the varying distances may have repeating patterns, etc.

In one implementation, a first magnet 312-1 and a second magnet 312-2 are separated by a first distance $d_{R1}$ and the second magnet 312-2 and a third magnet 312-3 are separated by a second distance $d_{R2}$ that is different than the first distance $d_{R1}$. Likewise, the third magnet 312-3 and a fourth magnet 312-4 are separated by a third distance $d_{R3}$, the fourth magnet 312-4 and a fifth magnet 312-5 are separated by a fourth distance $d_{R4}$, the fifth magnet 312-5 and a sixth magnet 312-6 are separated by a fifth distance $d_{R5}$, the sixth magnet 312-6 and a seventh magnet 312-7 are separated by a sixth distance $d_{R6}$, the seventh magnet 312-7 and an eighth magnet 312-8 are separated by a seventh distance $d_{R7}$, the eighth magnet 312-8 and a ninth magnet 312-9 are separated by an eighth distance $d_{R8}$, and the ninth magnet 312-9 and the first magnet 312-1 are separated by a ninth distance $d_{R9}$.

In accordance with the described implementations, at least two of the distances $d_{R1}$, $d_{R2}$, $d_{R3}$, $d_{R4}$, $d_{R5}$, $d_{R6}$, $d_{R7}$, $d_{R8}$, and $d_{R9}$ are different. In some implementations, all of the distances may be different. In other implementations, the varying distances may be arranged in a repeating pattern. For example, the first magnet 312-1 and a second magnet 312-2 may be separated by the first distance $d_{R1}$, the second magnet 312-2 and the third magnet 312-3 may be separated by the second distance $d_{R2}$ that is different than the first distance $d_{R1}$, the third magnet 312-3 and the fourth magnet may be separated by a third distance $d_{R3}$ that is different than the first distance $d_{R1}$ and the second distance $d_{R2}$, the fourth magnet 312-4 and the fifth magnet 312-5 may be separated by the first distance $d_{R1}$, the fifth magnet 312-5 and the sixth magnet 312-6 may be separated by the second distance $d_{R2}$, the sixth magnet 312-6 and the seventh magnet 312-7 may be separated by the third distance $d_{R3}$, the seventh magnet 312-7 and the eighth magnet 312-8 may be separated by the first distance $d_{R1}$, the eighth magnet 312-8 and the ninth magnet 312-9 may be separated by the second distance $d_{R2}$, and the ninth magnet 312-9 and the first magnet 312-1 may be separated by the third distance $d_{R1}$. By having such a repeating pattern, upon detection of one of the distances, a relative position of the rotor with respect to the electromagnetic coils can be determined.

In yet another example, the separation of the magnets may include a repeating pattern, such as the one illustrated above, with an additional distance between two magnets that is different than any of the distances of the repeating pattern. The unique distance may be used as a position determinant that when detected indicates an absolute position of the rotor of the motor.

As discussed further below, the variability in the distance between the magnets may be just a few millimeters. As the rotor rotates, the one or more sensors, such as a Hall sensor, may be positioned on the base of the motor to detect a presence or absence of a magnet as the magnets pass over or past the sensors. In the implementation illustrated in FIGS. 3A and 3B, a sensor may be included on the base of the motor and adjacent each electromagnetic coil 302 of the stator such that the sensor can detect a presence of an approaching magnet before the magnet reaches the corresponding electromagnetic coil. For example, a first sensor 302-2 may be positioned adjacent a first electromagnetic coil 302-1, a second sensor 304-2 may be positioned adjacent a second electromagnetic coil 304-1, a third sensor 306-2 may be positioned adjacent a third electromagnetic coil 306-1, a fourth sensor 308-2 may be positioned adjacent a fourth electromagnetic coil 308-1, a fifth sensor 310-2 may be positioned adjacent a fifth electromagnetic coil 310-1, and a sixth sensor 313-2 may be positioned adjacent a sixth electromagnetic coil 313-1.

As the rotor rotates, each of the sensors detect a presence or absence of a magnet 312 of the rotor as the magnets pass over the sensors. At each detection of a magnet, the sensor may send an indication of the detected presence of the magnet. The indication may be sent to a controller and the respective controller may determine a current pattern to apply to an electromagnetic coil 309 to either retract or repel the magnet as it passes the electromagnetic coil. In some implementations, each of the sensors 302-2, 304-2, 306-2, 308-2, 310-2, and 313-2 may be coupled to a respective controller 302-3, 304-3, 306-3, 308-3, 310-3, and 313-3.

As illustrated in FIG. 3B, the controllers 302-3, 304-3, 306-3, 308-3, 310-3, and 313-3 may likewise be included in the base of the motor and be configured to control and/or send currents to respective electromagnetic coils. For example, each controller 302-3, 304-3, 306-3, 308-3, 310-3, and 313-3 may be configured to provide one or more current and/or current patterns to a respective electromagnetic coil 302-1, 304-1, 306-1, 308-1, 310-1, and 313-1.

For example, the first sensor 302-2 may detect a presence of a magnet 312 as the magnet passes over or by the sensor 302-2. The sensor, in response to detecting the magnet sends an indication to the controller 302-3. The controller, upon receiving an indication of the presence of the magnet causes a current to be applied to the electromagnetic coil 302-1 that will cause the detected magnet to be attracted toward the electromagnetic coil or repelled away from the electromagnetic coil. In some implementations, the sensor may also determine based on indications received from the sensor a distance between two detected magnets. For example, the sensor may receive an indication from the UAV control system indicating a commanded rotational speed for the motor. Based on the commanded rotation speed and a time between indications from the sensor indicating the presence of magnets, the controller can determine a distance between the two detected magnets. Depending on the configuration of the motor, the determined distance may be used to determine a relative position of the rotor (e.g., for a repeating pattern) or an absolute position of the rotor (e.g., for a rotor in which each distance is distinct, or upon detection of a unique distance).

While the above example describes the use of a sensor and controller for each of the electromagnetic coils, in other implementations, fewer or additional sensors may be utilized. For example, the UAV control system and/or a controller used to provide current to the electromagnetic coils of the motor may contain motor configuration information indicating the spacing distances between each magnet of the rotor and/or the spacing and position of the electromagnetic coils. Upon determination by one or more sensors of a spacing between two or more magnets, a relative or absolute position of the rotor, based on the known magnet configuration, can be determined. Based on the determined position of the rotor and the known position of the magnets and electromagnetic coils of the motor, current patterns may be selected from a defined table maintained in the UAV data store (discussed below) and sent to the respective electromagnetic coils to control operation of the motor.

For example, if the separation distance between each magnet of a rotor is different, upon detection by a single sensor of two magnets and a determination of the distance between those magnets, the absolute position of the rotor and each magnet of the rotor can be determined. Based on the determined positions, different current patterns may be sent to each of the electromagnetic coils of the motor. In a similar example, if there are three different separation distances that repeat around the rotor, upon detection of one of the three separation distances, a relative position of the rotor can be determined and current patterns sent to the electromagnetic coils based on the determined position of the rotor.

As still another example, if the different spacing distances include at least one unique distance, upon detection of the unique distance between two magnets the absolute position of the rotor can be determined from a single sensor.

Figure 4:
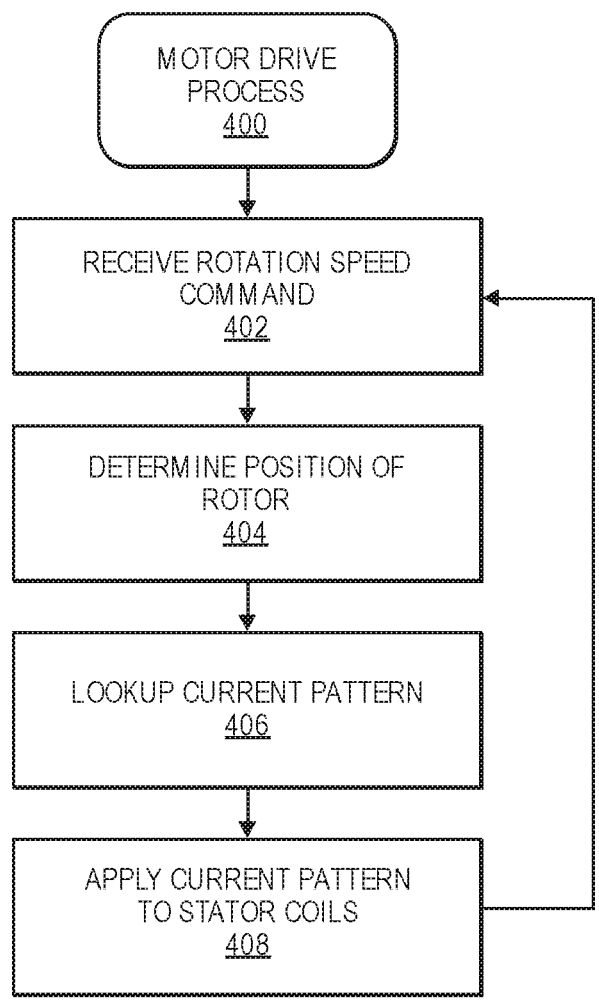
FIG. 4 is a flow diagram illustrating an example motor drive process, according to an implementation.

FIG. 4 is a flow diagram illustrating an example motor drive process 400, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins upon receipt of a motor rotation speed command, as in 402. For example, the navigation system of the UAV and/or a remote control system may send a navigation command commanding the UAV to aerially navigate in a direction. The received command is converted into a motor command that includes a motor rotation speed necessary for the motor to execute the navigation command in conjunction with other motors of the UAV.

The example process 400 then determines the position of the rotor, as in 404. As discussed above, the position of the rotor may be determined using one or more sensors that detect the presence or absence of magnets of the rotor. Based on at least two detected magnets and a current rotational speed of the motor, a distance between the magnets may be determined. Based on the measured distance between the magnets, the position of the rotor can be determined. For example, motor configuration information, such as the distance of spacing between the rotor magnets may be maintained in a data store. Using the measured distance and the stored motor configuration information, the position of the rotor may be determined.

Upon determining the position of the rotor and known motor configuration information, a current pattern for one or more of the electromagnetic coils of the stator of the motor may be determined, as in 406. For example, the data store may maintain current pattern information that is to be applied to achieve different RPM from the motor. A current pattern may be a series of currents that are to be applied to the electromagnetic coil of the motor during one revolution of the rotor. Based on the position of the rotor and a commanded RPM, the selected current pattern may be initiated at a specific point to correspond with the position of the rotor magnets with respect to the electromagnetic coils of the stator of the motor.

Based on the selected current pattern, the current pattern is applied to one or more of the electromagnetic coils of the motor, as in 408. In some implementations, the same current pattern may be applied to each of the electromagnetic coils, phase shifted based on the position of the rotor magnets. Alternatively, different current patterns may be applied to one or more of the electromagnetic coils based on the position of the rotor magnets. In some implementations, different current patterns may result in the motor producing different output sounds during operation of the motor. Likewise, in some implementations, a current pattern from a first electromagnetic coil of the stator may generate a first sound output and a current pattern from a second electromagnetic coil of the stator may generate a second sound output. Likewise, the first sound output may cause interference with the second sound output, thereby altering a total sound generated during operation of the motor. In some implementations, the interference may be destructive interference that reduces the total sound output from the motor during operation of the motor.

The example process 400 continues during operation of the motor with potentially a different current pattern for each electromagnetic coil being selected and produced for each revolution of the motor. Accordingly, as the current pattern(s) is applied to the electromagnetic coil(s) the example process 400 returns to block 402 and continues during motor operation. If the commanded RPM and/or other forces (e.g., wind) are acting upon the aerial vehicle, the current pattern may vary for each rotation to alter the rotation of the motor and thus the sound produced by the motor.

While the above examples have been discussed with respect to an outrunner brushless DC motor, the implementations are equally applicable to an inrunner brushless DC motor in which the stator surrounds the rotor and the rotor rotates within a cavity formed by a stationary stator.

In addition to altering sound generated from operation of a motor, as discussed above, in some implementations, one or more motor properties may be altered during operation of the motor. For example, the back-EMF of a motor may be altered during motor operation by altering the diameter of the rotor of the motor. Such motor property modification may be utilized in motors having irregularly spaced magnets, as discussed above, or in motors with evenly spaced magnets.

Figure 5A:
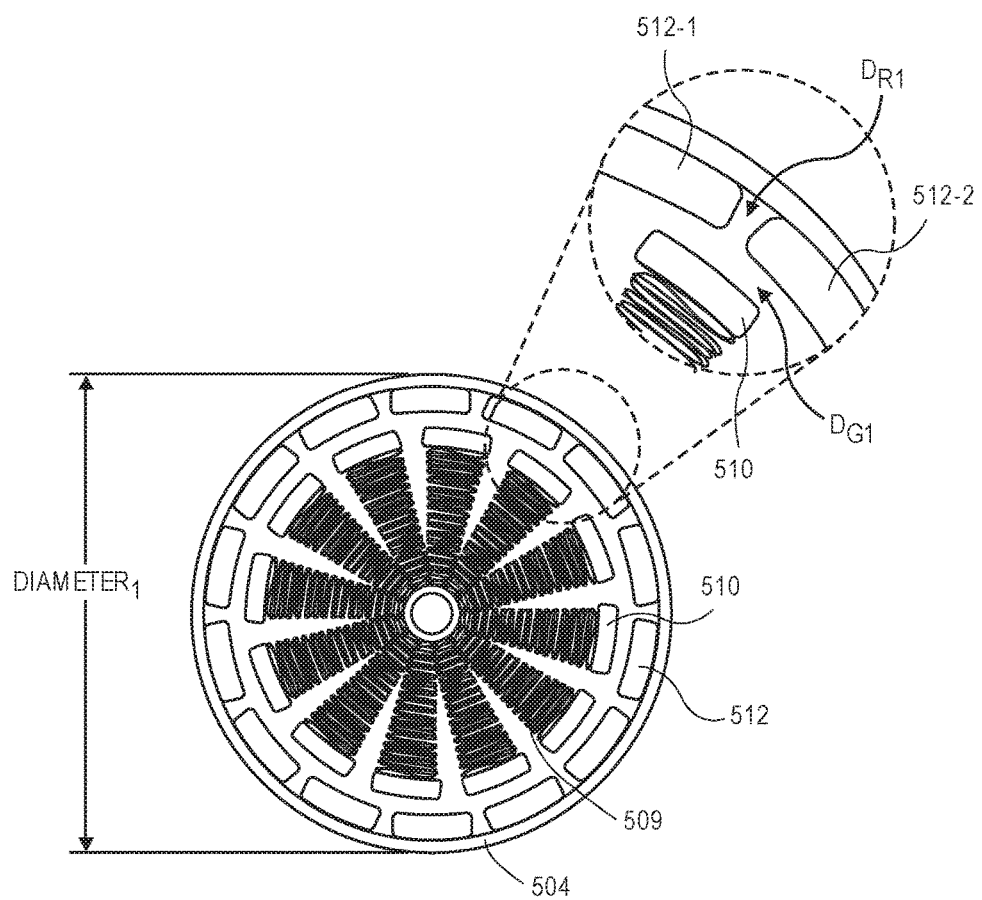
FIG. 5A depicts a top-down view of a motor stator and a rotor in a contracted position, according to an implementation.

FIG. 5A depicts a top-down view of a motor stator 509 and a rotor 504 in a contracted position, according to an implementation. As illustrated, the diameter (Diameter$_1$) of the rotor 504 in a contracted position results in the rotor magnets 512 being close to the electromagnetic coils 510 of the stator 509 such that the motor has a high torque. The torque is directly correlated to the back-EMF of the motor. Back-EMF refers to the voltage that occurs in electric motors where there is a relative motion between the rotor and the magnetic field from the electromagnetic coils of the stator. The smaller the gap ($D_{G1}$) between the stator 510 and the rotor magnets the higher the back-EMF and thus the higher the torque of the motor.

In addition to the rotor having a gap distance ($D_{G1}$) between the rotor motors 512 and the electromagnetic coils 510, the rotor magnets are also separated by a contracted distance, referred to in the expanded view of FIG. 5A as distance $D_{R1}$. As noted above, the distance between the rotor magnets may be uniform or irregular. Regardless, in the contracted configuration illustrated in FIG. 5A, each of the rotor magnet are separated by a distance ($D_{R1}$), generally referred to herein as a contracted distance. For example, rotor magnet 512-1 and rotor magnet 512-2 are separated by a distance $D_{R1}$.

While a higher back-EMF produces more torque for the motor, it also results in a lower maximum RPM for the motor and requires additional power to maintain the motor at a commanded RPM. During certain navigations, such as during takeoff, landing, ascent, descent, or specific maneuvers, increased torque may be desirable, even at the expense of a maximum RPM and/or increased power consumption. However, during other aerial navigations, such as in-transit flight where the UAV is at a high altitude and navigating in a substantially horizontal direction at a high speed, increased torque may not be as desirable as a higher maximum RPM and decreased power savings. To increase the maximum RPM, the back-EMF may be reduced by, for example, increasing the gap distance between the rotor magnets and the electromagnetic coils of the stator.

Figure 5B:
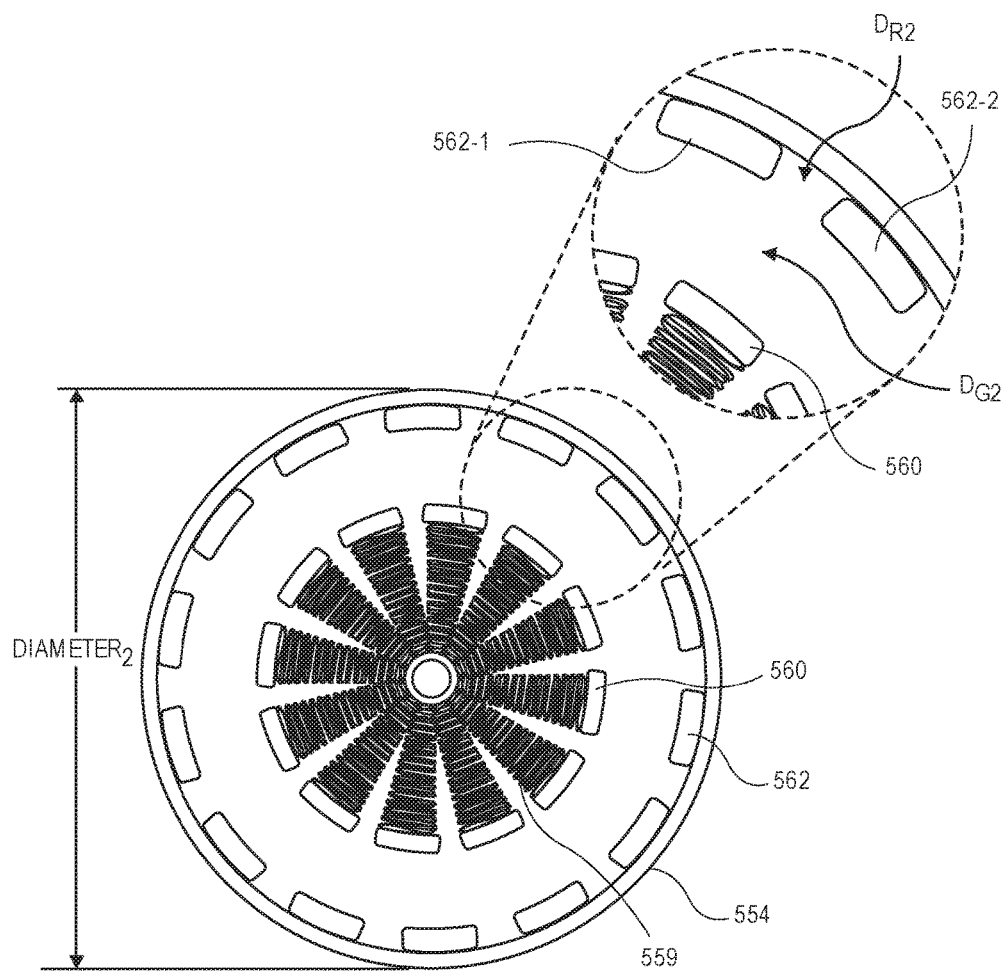
FIG. 5B depicts a top-down view of the motor stator and rotor of FIG. 5A with the rotor in an expanded position, according to an implementation.

FIG. 5B depicts a top-down view of the motor stator 559 and rotor 554 of FIG. 5A with the rotor in an expanded position, according to an implementation. As discussed below, the diameter of the rotor may be altered from a contracted position, as illustrated in FIG. 5A, to an expanded position, as illustrated in FIG. 5B, using a variety of techniques. For example, the material used for form the rotor housing may include a memory metal that transitions from the contracted position to the expanded position in response to a force and/or energy, such as heat.

As illustrated in FIG. 5B, when the rotor 554 is in an expanded position it has a second diameter (Diameter$_2$) that is larger than the first diameter (Diameter$_1$) illustrated in FIG. 5A. As a result, the gap distance $D_{G2}$ between the rotor magnets 562 and the electromagnetic coils 560 of the stator 559 increases. Likewise, the distance $D_{R2}$ between the rotor magnets also increases. For example, the expanded distance $D_{R2}$ between a first rotor magnet 562-1 and a second rotor magnet 562-2 is larger than the contracted distance $D_{R1}$ between the same magnets when the rotor is in a contracted position, as illustrated in FIG. 5A.

By expanding the diameter of the rotor and thus increasing the gap distance $D_{G2}$ between the rotor magnets and the electromagnetic coils, the back-EMF decreases, which also results in the torque of the motor decreasing but the maximum RPM of the motor increasing. Likewise, the power consumed by the motor to maintain a commanded RPM is less when the rotor of the motor is in an expanded position. In some implementations, the difference in the gap distance between the rotor magnets and the electromagnetic coils in a contracted position versus an expanded position may only be a few millimeters. However, such a difference may result in a change in the back-EMF and/or other motor properties.

Figure 6A:
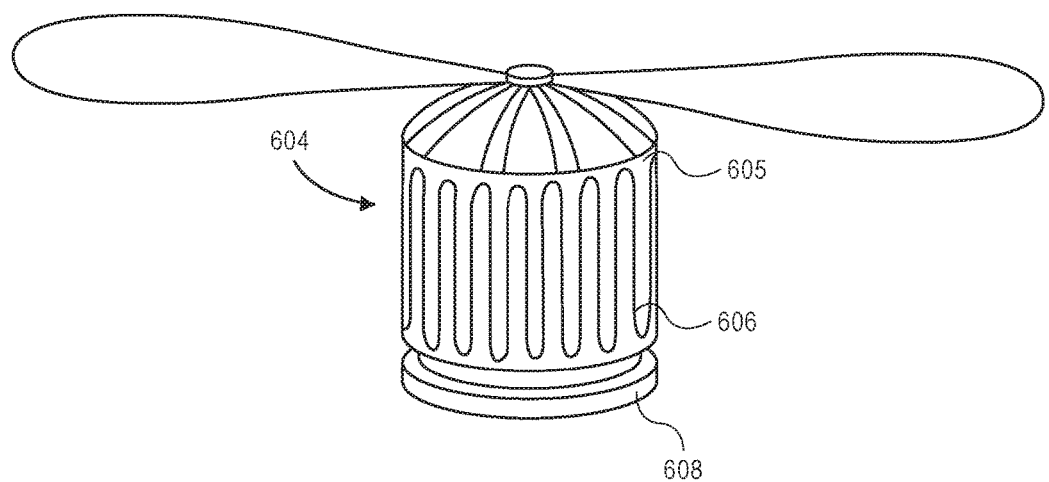
FIG. 6A depicts a rotor in a contracted position, according to an implementation.
Figure 6B:
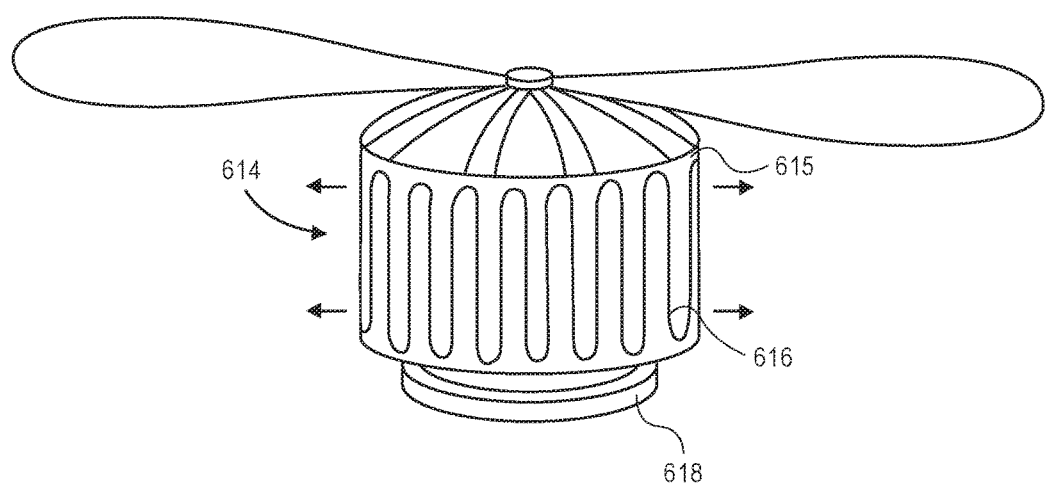
FIG. 6B depicts the rotor of FIG. 6A in an expanded position, according to implementation.

FIG. 6A depicts a motor in which the rotor 604 is in a contracted position, according to an implementation. In this example, the exterior of the rotor housing 605 includes a heating element 606. As a reference point when comparing FIG. 6A and FIG. 6B, when the rotor 604 is in the contracted position (FIG. 6A), the rotor is approximately the same size as the base 608 of the motor. However, when the rotor 614 is in an expanded position (FIG. 6B), the rotor 614 is larger than the base 618 of the motor. In this example, the rotor is formed of a material that expands when heated. Accordingly, to cause the rotor to expand, the heating element 606/616 is energized, thereby transferring heat from the heating elements 606/616 into the material of the rotor housing, thereby causing the rotor to expand. When the rotor is to contract, the heating element is de-energized and the material of the rotor housing cools and contracts.

A variety of techniques may be utilized to enable expansion and contraction of the rotor. For example, the rotor housing 605 may be formed of one or more adaptable materials that may expand or contract under certain conditions. For example, the adaptable material of the rotor housing 605 may include one or more of a shape memory alloy, such as, but not limited to, copper-aluminum-nickel alloy, nickel-titanium (NiTi), alloy, zinc alloy, copper alloy, gold alloy, iron alloy, etc.

In such examples, a force and/or energy may be applied to the adaptable material that causes the adaptable material, and thus the rotor, to transition from a contracted position to an expanded position, or transition from an expanded position to a contracted position. For example, as discussed above with respect to FIGS. 6A and 6B, when energy, such as heat, is applied to the rotor housing, the adaptable material transitions from a contracted position (FIG. 6A) to an expanded position (FIG. 6B). When the rotor housing transitions to the expanded position, it causes the gap between the rotor magnets and the electromagnetic coils of the stator to increase. When the adaptable material is not heated, the rotor returns to the contracted position (FIG. 6A) and the gap between the rotor magnets and the electromagnetic coil of the stator decrease.

The adaptable material may also be configured to respond to other forms of energy and either contract or expand in response to one or more other forms of energy. Other forms of energy that may be utilized to cause an adaptable material of the rotor to transition from a contracted position to an expanded position, and/or transition from the expanded position to the contracted position include, but are not limited to, motion, sound, light, or heat.

Figure 6C:
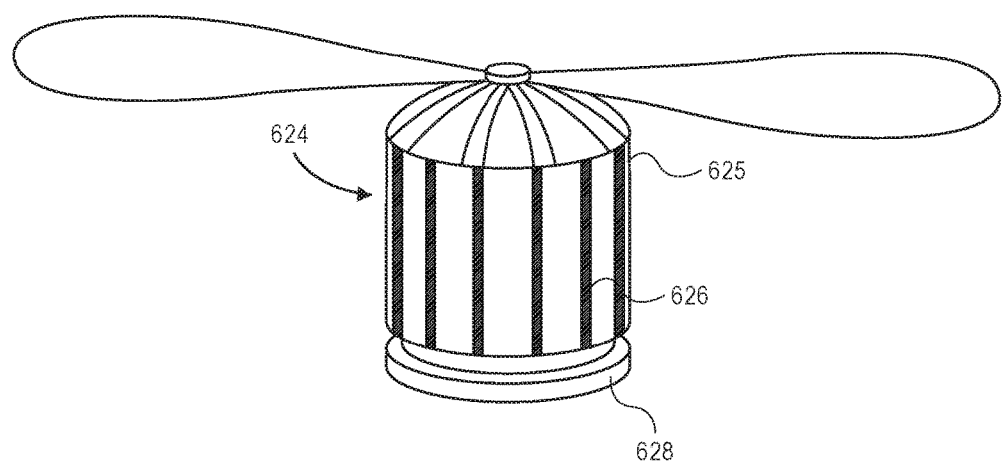
FIG. 6C depicts a rotor in a contracted position, according to an implementation.
Figure 6D:
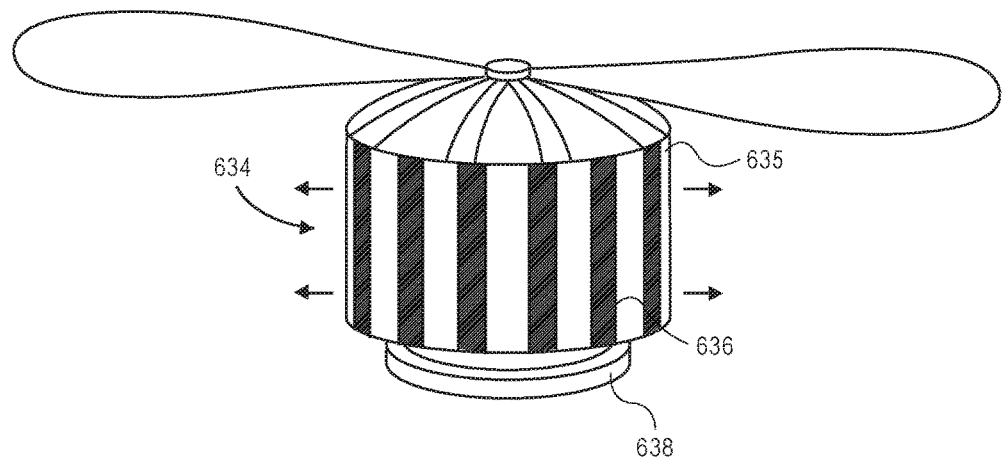
FIG. 6D depicts the rotor of FIG. 6C in an expanded position, according to implementation.

In some implementations, other rotor housing configurations may be utilized to cause the rotor to expand and/or contract. For example, the rotor housing may be configured to transition from a contracted position to an expanded position in response to a force being applied to the rotor housing. The force may include, but is not limited to, a mechanical force, an electrical force, or a centrifugal force. For example, FIG. 6C depicts a rotor 624 with a rotor housing 625 in a contracted position, according to an implementation. In this example, the rotor housing 625 includes one or more channels 626 formed in the surface of the rotor housing 625 and between the rotor magnets that are mounted to the interior of the rotor housing, as illustrated above. As a reference point when comparing FIG. 6C and FIG. 6D, when the rotor 634 is in the contracted position (FIG. 6C), the rotor is approximately the same size as the base 628 of the motor. However, when the rotor 624 is in an expanded position (FIG. 6D), the rotor 634 is larger than the base 638 of the motor. In this example, the channels 626/636 expand or contract to cause the rotor housing 625/635 to expand or contract. In some implementations, the transition of the rotor from a contracted position (FIG. 6C) to an expanded position (FIG. 6D) may be done using mechanical force and one or more actuators or motors that are included in the rotor housing 625 that cause the channels to expanded and/or contract.

In other implementations, the channels may be formed of one or more pre-tensioned springs that couple adjacent portions of the rotor housing 205 together and allow conductivity between the rotor magnets. In such a configuration, as the RPM of the motor increases, the centrifugal force causes the springs to expand, thus expanding the channels 636 such that the rotor transitions from the contracted position to the expanded position. Likewise, as the RPM of the motor decreases, the decrease in centrifugal force acting on the motor will allow the springs to contract, transitioning the rotor from the expanded position to the contracted positions. In other implementations, the channels may be formed of rubber, such as a conductive rubber, piezoelectric strips that can be actuated to expand or contract, springs, etc.

Figure 7:
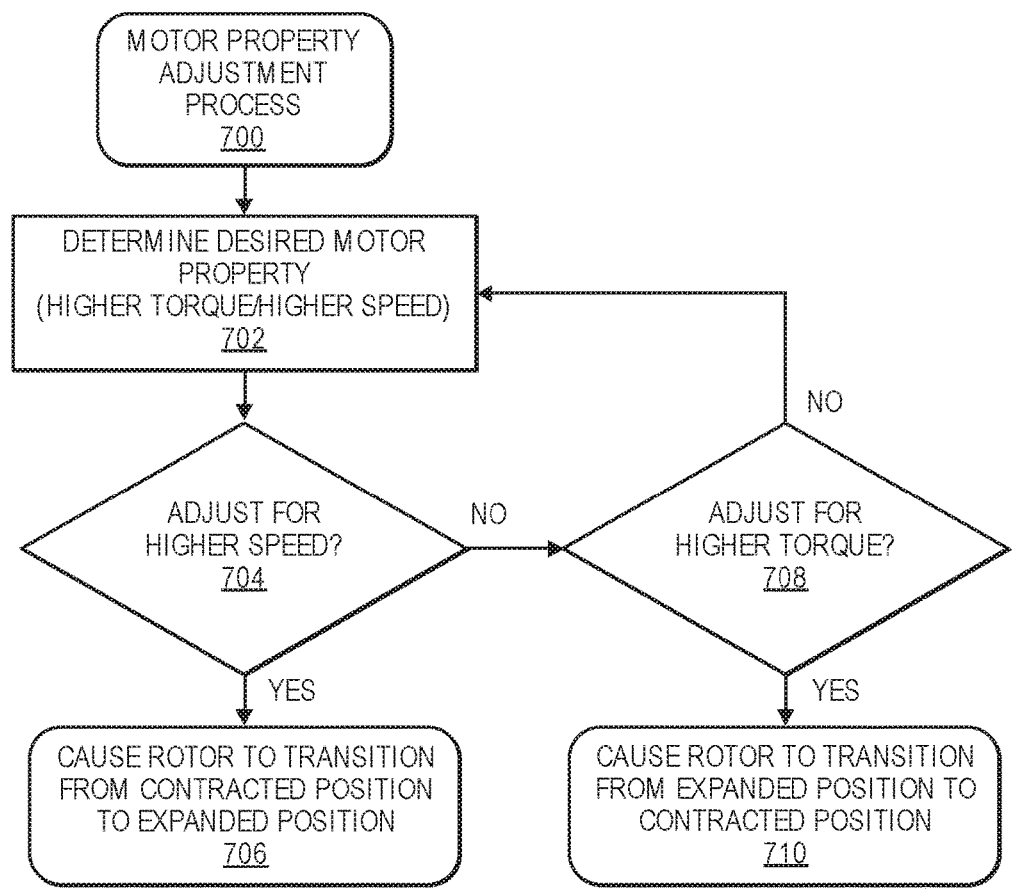
FIG. 7 is a flow diagram illustrating an example motor property adjustment process, according to an implementation.

FIG. 7 is a flow diagram illustrating an example motor property adjustment process 700, according to an implementation. The example process 700 begins during operation of the aerial vehicle and determines a desired motor property, as in 702. As discussed above, the described implementations allow alteration of motor properties during aerial navigation and operation of the motor. For example, a first motor property may include a higher torque, a higher back-EMF, with a lower maximum RPM, and potentially increased power consumption. A second motor property may include a lower torque, a lower back-EMF, with a higher maximum RPM, and potentially decreased power consumption.

A determination is then made as to whether the motor is to be adjusted for higher speed, as in 704. If it is determined that the motor is to be adjusted for higher speed, the example process 700 causes the rotor to transition from a contracted position to an expanded position, as in 706. As discussed above, causing the rotor to transition from a contracted position to an expanded position may be done by applying or removing one or more forces (e.g., mechanical, electrical) or one or more energies (e.g., heat, sound, light) to the rotor housing that cause or allow the rotor housing to expand.

If it is determined that the motor is not to be adjusted for higher speed, a determination is made as to whether the motor is to be adjusted for higher torque, as in 708. If it is determined that the motor is not to be adjusted for higher speed or higher torque, the example process 700 returns to block 702 and continues. However, if it is determined that the motor is to be adjusted for higher torque, the example process 700 causes the rotor to transition from the expanded position to the contracted position, as in 710. As discussed above, causing the rotor to transition from an expanded position to a contracted position may be done by applying or removing one or more forces (e.g., mechanical, electrical) or one or more energies (e.g., heat, sound, light) to the rotor housing that cause or allow the rotor housing to contract.

The example process may be continually performed during operation of the aerial vehicle, performed periodically, performed at specific waypoints during aerial navigation of the vehicle, and/or at any other time during operation. For example, each time a UAV transitions from vertical flight to horizontal flight, the example process 700 may be performed to determine whether motor properties for motors of the aerial vehicle are to be altered. Such a determination may be based on, for example, the speed of the aerial vehicle, the flight plan for the aerial vehicle, the altitude of the aerial vehicle, other objects detected in the vicinity of the aerial vehicle, etc.

Figure 8:
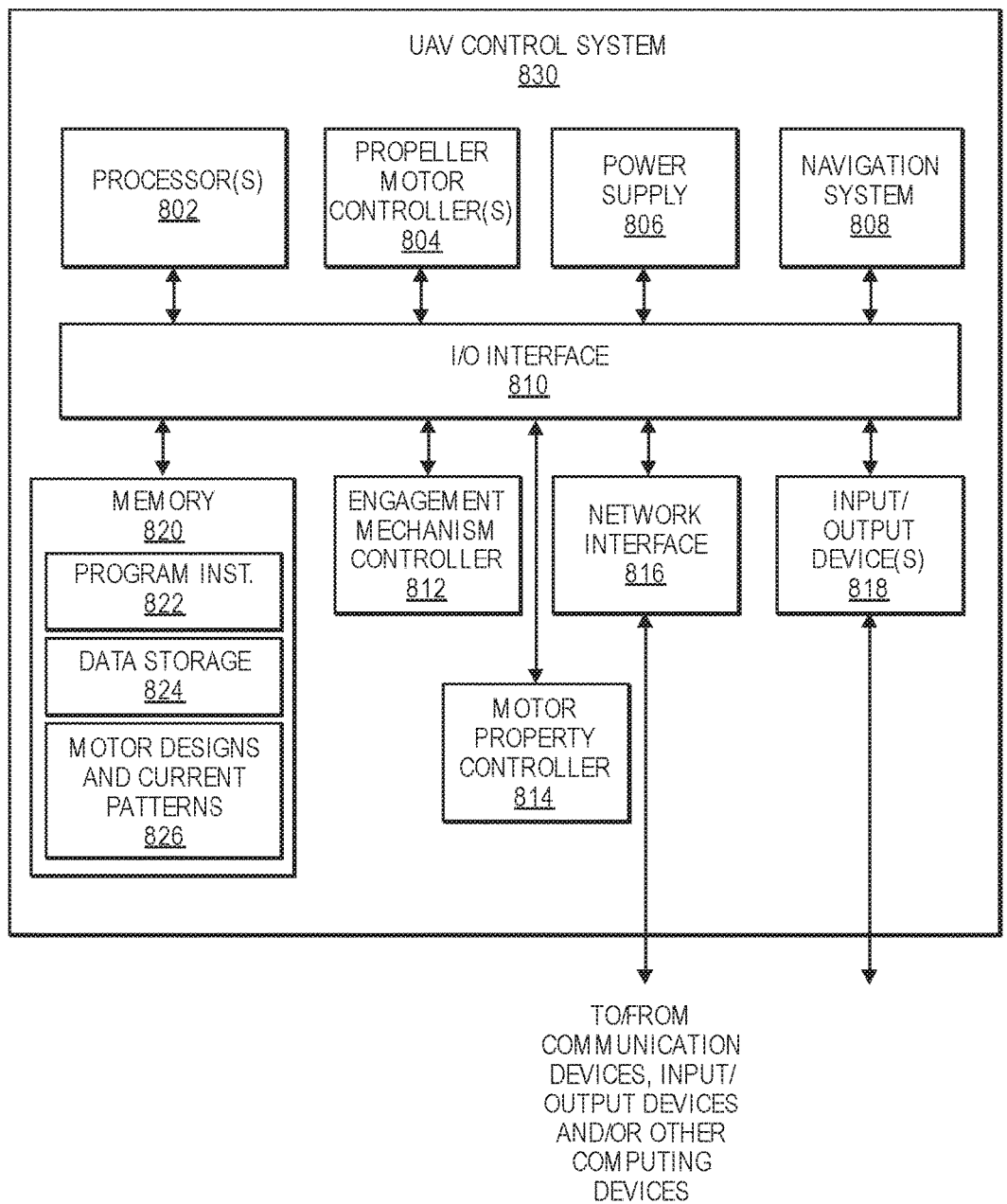
FIG. 8 is a block diagram illustrating various components of an unmanned aerial vehicle control system, according to an implementation.

FIG. 8 is a block diagram illustrating an example UAV control system 830 that may be used with a UAV, such as the UAV discussed above with respect to FIG. 1. In various examples, the block diagram may be illustrative of one or more aspects of the UAV control system 830 that may be used to implement the various systems and methods discussed above. In the illustrated implementation, the UAV control system 830 includes one or more processors 802, coupled to a non-transitory computer readable storage medium 820 via an input/output (I/O) interface 810. The UAV control system 830 may also include a motor controller 804, also known as an electronic speed control (ESC), power supply module 806, and/or a navigation system 808. The UAV control system 830 may also include an engagement mechanism controller 812, a network interface 816, one or more input/output devices 818, and/or a motor property controller 819.

In various implementations, the UAV control system 830 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824, and motor design and current patterns 826, respectively. In other implementations, program instructions, current patterns, flight plants, and/or other data may be received, sent, or stored upon different types of computer-accessible media, such as non-transitory media, or on similar media separate from the non-transitory computer readable storage medium 820 or the UAV control system 830. Generally speaking, a non-transitory, computer readable storage medium may include storage media or memory media such as magnetic or optical media, e.g., disk or CD/DVD-ROM, coupled to the UAV control system 830 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818.

In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The motor controller(s) 804 communicate with the navigation system 808 and adjust the power of each motor to fly the UAV along a determined flight path. As discussed above, in some implementations, the motor controllers send signals directly to the motor that cause different currents to be applied to the motors. In other implementations, the motor controller(s) 804 send instructions to controllers integrated into the motors that convert the information received from the motor controller(s) 804 to different current patterns for the motor based on the motor design and/or position of the rotor of the motor. In still other implementations, the motor controller(s) 804 may be omitted and the motors of the UAV may communicate directly with the navigation system 808 and control operation of the respective motors.

The power supply module 806 may control the charging and any switching functions associated with one or more power modules (e.g., batteries) of the UAV. The engagement mechanism controller 812 communicates with mechanisms (e.g., a servomotor) used to engage and/or disengage items to be carried during flights. The network interface 816 may be configured to allow data to be exchanged between the UAV control system 830 and other devices attached to a network, such as other computer systems. In various implementations, the network interface 816 may support communication via wireless general data networks, such as a Wi-Fi network. For example, the network interface 816 may support communication via telecommunications networks such as cellular communication networks, satellite networks, and the like.

Input/output devices 818 may, in some implementations, include one or more displays, image capture devices, thermal sensors, infrared sensors, time of flight sensors, accelerometers, pressure sensors, airflow sensors, speed sensors, vibration sensors, noise sensors, weight sensors, temperature sensors, etc. Multiple such input/output devices 818 may be present and controlled by the UAV control system 830. Certain sensors may also be utilized to assist with navigation, landings, avoiding obstacles during flight, etc.

The motor property controller 819 communicates with and/or controls motor properties of the motors. As discussed above, motor properties of one or more motors of the UAV may be altered by altering the diameter of the rotor of the motor. The motor property controller may communication with the navigation system 808 and determine desired motor properties. Based on the determined desired motor properties, the motor property controller may send instructions to the motors and/or send energy (e.g., heat) to the motors that cause the rotor of the motor to contract or expand, thereby altering the motor property of the motor.

As shown in FIG. 8, the memory may include program instructions 822 that may be configured to implement the example processes and/or sub-processes described above. The data storage 824 may include various data stores for maintaining data items that may be provided for determining flight plans, landing, etc. In some implementations, data stores may be physically located in one memory or may be distributed among two or more memories.

Those skilled in the art will appreciate that the UAV control system 830 is merely illustrative and is not intended to limit the scope of the present disclosure. In particular, the computing system and devices may include any combination of hardware or software that can perform the indicated functions. The UAV control system 830 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 830. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 830 may be transmitted to the UAV control system 830 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An outrunner brushless direct current (DC) motor, comprising:
    a base;
    a stator affixed to the base and including a plurality of electromagnetic coils;
    a rotor including a rotor housing forming a cavity that substantially encompasses the stator, the rotor housing including an adaptable material that causes the rotor to have a first diameter at a first temperature and further causes the rotor to have a second diameter at a second temperature that is different than the first diameter; and
    a heating element configured to alter a temperature of the adaptable material to transition from the first temperature to the second temperature such that the rotor transitions from the first diameter to the second diameter.

2. The outrunner brushless DC motor of claim 1, further comprising:
    a plurality of magnets coupled to an interior surface of the rotor and spaced a first distance from the plurality of electromagnetic coils when the rotor has the first diameter and spaced a second distance from the electromagnetic coils when the rotor has the second diameter.

3. The outrunner brushless DC motor of claim 2, wherein:
    the second diameter is larger than the first diameter; and
    the second distance is larger than the first distance, such that a back-electromotor force (back-EMF) of the motor is decreased when the rotor has the second diameter.

4. The outrunner brushless DC motor of claim 1, wherein:
    the adaptable material includes a shape memory alloy.

5. The outrunner brushless DC motor claim 4, wherein the shape memory alloy includes at least one of a copper-aluminum-nickel alloy, a nickel-titanium (NiTi) alloy, a zinc alloy, a copper alloy, a gold alloy, or an iron alloy.

6. A propeller motor, comprising:
a base;
a stator including a plurality of electromagnetic coils; and
a rotor forming a cavity that substantially encompasses the plurality of electromagnetic coils, the rotor at least partially formed of a material that is adjustable during operation of the propeller motor between:
   a contracted position in which the rotor has a first diameter, and
   an expanded position in which the rotor has a second diameter that is larger than the first diameter; and
an element coupled to a surface of the rotor and configured to apply an energy to the material of the rotor; and
wherein the rotor transitions from the first diameter to the second diameter in response to the energy.

7. The propeller motor of claim 6, wherein:
the propeller motor has a first torque, a first back-electromotor force (back-EMF), and a first maximum revolutions per minute (RPM) in the contracted position;
the propeller motor has a second torque, a second back-EMF, and a second maximum RPM in the expanded position;
the first torque is higher than the second torque;
the first back-EMF is higher than the second back-EMF; and
the first maximum RPM is lower than the second maximum RPM.

8. The propeller motor of claim 6, further comprising:
a plurality of magnets coupled to an interior of the rotor, the plurality of magnets separated from the plurality of electromagnetic coils by a first distance when the rotor is in the contracted position and separated from the plurality of electromagnetic coils by a second distance when the rotor is in the expanded position.

9. The propeller motor of claim 6, wherein the material of the rotor expands when a force is applied to the material such that the rotor also transitions from the first diameter to the second diameter when the force is applied.

10. The propeller motor of claim 9, wherein the force is at least one of a mechanical force, an electrical force, or a centrifugal force.

11. The propeller motor of claim 6, wherein the energy is at least one of a motion, a sound, a light, or a heat.

12. The propeller motor of claim 6, wherein:
the rotor includes a plurality of channels formed in a surface of the rotor; and
the plurality of channels expand as a rotation of the rotor increases, thereby causing the rotor to transition from the first diameter to the second diameter.

13. The propeller motor of claim 6, wherein:
the element is a heating element and the energy is heat; and
the rotor transitions from the first diameter to the second diameter when heated.

14. A computer-implemented method, comprising:
under control of one or more computing systems configured with executable instructions,
   causing, during operation of a motor, a rotor of the motor to have a first diameter such that the motor has a first motor property;
   determining, during operation of the motor, that the motor is to have a second motor property; and
   in response to determining that the motor is to have the second motor property, causing, during operation of the motor, an element to apply an energy to the rotor such that the rotor of the motor expands from the first diameter to a second diameter and the motor operates with the second motor property.

15. The computer-implemented method of claim 14, wherein:
the first motor property includes a first torque and a first maximum revolutions per minute (RPM);
the second motor property includes a second torque and a second maximum RPM;
the second torque is less than the first torque; and
the second maximum RPM is higher than the first maximum RPM.

16. The computer-implemented method of claim 14, further comprising:
determining, during operation of the motor, that the motor is to have the first motor property; and
causing, during operation of the motor, the rotor of the motor to contract such that the rotor of the motor has the first diameter and the motor operates with the first motor property.

17. The computer-implemented method of claim 14, wherein a back-electromotor force (back-EMF) decreases when the rotor of the motor expands from the first diameter to the second diameter.

18. The computer-implemented method of claim 14, wherein a distance between a plurality of electromagnetic coils of a stator of the motor and a plurality of magnets of the rotor of the motor increases when the rotor of the motor expands.

19. The computer-implemented method of claim 14, wherein a back-electromotor force (back-EMF) of the motor changes in response to a change in a diameter of the rotor of the motor.

* * * * *